United States Patent [19]

Krude et al.

[11] Patent Number: 4,611,681
[45] Date of Patent: Sep. 16, 1986

[54] INDEPENDENT WHEEL SUSPENSION SYSTEM USING THRUST BEARING CONSTANT VELOCITY UNIVERSAL DRIVE JOINTS AS SUSPENSION MEMBERS

[75] Inventors: Werner Krude, Grosse Pointe Park; Daniel W. Hazebrook, Detroit, both of Mich.

[73] Assignee: GKN Automotive Components Inc., Southfield, Mich.

[21] Appl. No.: 586,086

[22] Filed: Mar. 5, 1984

[51] Int. Cl.⁴ ............................................. B60K 20/00
[52] U.S. Cl. .................................... 180/73.4; 280/701
[58] Field of Search ................ 280/701; 180/71, 73.1, 180/73.3, 73.4, 73.5

[56] References Cited

U.S. PATENT DOCUMENTS

| | | | |
|---|---|---|---|
| 2,475,487 | 7/1949 | Ennis | 180/73.1 |
| 3,362,498 | 1/1968 | Allison | 280/701 |
| 3,451,497 | 6/1969 | Barnes et al. | 180/73.1 |
| 4,417,643 | 11/1983 | Guimbretiere | 180/73.1 |

FOREIGN PATENT DOCUMENTS 2374180  7/1978  France .................... 180/73.1

Primary Examiner—John J. Love
Assistant Examiner—Ross Weaver
Attorney, Agent, or Firm—Remy J. VanOphem

[57] ABSTRACT

An independent wheel suspension system having at least two indispensable suspension members, the first of which includes two couplings one of which is a constant velocity universal joint connected by a drive shaft to the other coupling, the balls of the constant velocity universal joint carrying driving torque and the inner and outer members of the constant velocity universal joint carrying thrust loads generated externally of the constant velocity universal joint, both indispensable suspension members swinging about the articulation axis of the constant velocity universal joint about a swing axis therethrough and a pivot supporting the second indispensable suspension member from the vehicle frame.

12 Claims, 7 Drawing Figures

INDEPENDENT WHEEL SUSPENSION SYSTEM USING THRUST BEARING CONSTANT VELOCITY UNIVERSAL DRIVE JOINTS AS SUSPENSION MEMBERS

BACKGROUND OF THE INVENTION

Cross-Reference to Related Applications

This patent application is related to the following copending applications assigned to the common assignee hereof:

U.S. Ser. No. 586,012, filed Mar. 5, 1984, entitled "Independent Wheel Suspension System Using Thrust Bearing Constant Velocity Universal Drive Joints, Bending and Torsional Motion Resistance Suspension Members And A Transversely Pivotable Differential";

U.S. Ser. No. 586,056, filed Mar. 5, 1984 entitled "Independent Wheel Suspension System Using Thrust Bearing Constant Velocity Universal Drive Joints As Suspension Members In Combination With A Single Prop Shaft Joint and A Transversely Pivotable Differential";

U.S. Ser. No. 586,011, filed Mar. 5, 1984 entitled "Independent Wheel Suspension System Using Thrust Bearing Constant Velocity Universal Drive Joints As Suspension Members To Minimize Wheel Camber;

U.S. Ser. No. 586,022, filed Mar. 5, 1984 entitled "Independent Wheel Suspension System Using Constant Velocity Universal Joints In Combination With A Single Prop Shaft Joint And Mounted Differentials";

U.S. Ser. No. 586,098, filed Mar. 5, 1984 entitled "Independent Wheel Suspension Using Thrust Bearing Constant Velocity Universal Drive Joints As Suspension Members In Combination With A Wheel Assembly And Differential Coupled To Pivot About A Transverse Stabilizer"; and U.S. Ser. No. 586,054, filed Mar. 5, 1984 entitled "Independent Wheel Suspension System Having A Differential Pivotable About Two Axes".

FIELD OF THE INVENTION

The present invention pertains to independent wheel suspension systems, and more particularly to independent wheel suspension systems using constant velocity joints as suspension members.

DESCRIPTION OF THE PRIOR ART

The present invention has particular application to both front and rear wheel independent suspension systems wherein universal joints are used to transfer power from a power delivery unit, normally including an engine, transmission and a differential housing, through half-shaft drive axles to the driving wheels. As a vehicle moves along a road surface, the wheels naturally experience an up and down movement relative to the driving surface. This movement is referred to as jounce and rebound, and the road clearance of various vehicle components vary accordingly. If the wheels are allowed to move in a plane approximately normal to the driving surface, such up and down movements have heretofore required corresponding changes in the swing length between the wheel and the differential of the power delivery unit. Such changes in swing length are normally effected by allowing an axial adjustment either of a driving member relative to the wheels or of one member of a driving member relative to another. Because of the dynamic loads associated with these up and down movements of the wheel and the geometric movements of the suspension members as a result of the various load and road conditions experienced by the wheels of a vehicle, past suspension system design efforts have been directed towards completely isolating the drive system components from the suspension system components to prevent the application of suspension loads to the power delivery unit or torque translating drive components of a vehicle. As a result of this approach the structural design criteria of prior art vehicles is to limit the torque translating components of a vehicle to carry only torque loads to propel the vehicle and to design a separate suspension system to carry the loads associated with the up and down movement of the vehicle wheels as a result of load and/or road variations.

The foregoing jounce and rebound movements of the driving wheels relative to the road surface introduce lateral or axial thrust loads relative to the differential of the power delivery unit. The magnitude of such thrust loads is related to the transmitted torque and to road protuberances, cornering speeds, weight distribution, wheel camber, and load carried by the vehicle as well as other factors. Such axial thrust loads have been diverted from the torque translating driving joints by either suspension control members connecting the wheel assembly to other points on the chassis of the vehicle or by additional structure encasing either the torque translating half-shaft or driving joints.

Independent wheel suspension systems generally contemplate the use of two general types of universal driving joints: the Cardan-type joint and the constant velocity type joint. The Cardan-type joint consists of two yokes connected by a plain or rolling type bearing on the ends of a Cardan or cruciform shaped cross. The cross consists of a block and two pins, one pin being smaller than the other and passing through it. Even though heat-treated alloy steels are used throughout, the small pin diameters limit the capacity of the joint to carry axial thrust loads because such axial thrust loads normally impose stresses on the pins which are multiples of the stresses associated with carrying normal driving torque. Moreover, the stresses deleteriously augment each other through vector addition. The major deterrent to using a single Cardan-type joint in an independent rear suspension system, however, is the severe limitation on the allowable angle of articulation under high torque loads. This is because the velocity ratio of the speed of the driving to the driven shaft pulsates or "knuckles" with increasing amplitudes as the angular articulation between these shafts increases. The cyclic speed pulsations significantly increase as articulation between the driving and driven joint members increase. Such speed pulsations cause correspondingly higher dynamic stresses on the Cardan cross pins and corresponding vehicle vibration and noise as loads of any appreciable inertia are translated through the joint. The higher dynamic stresses wear the joint structure to degeneratively further increase the speed variations and further limit the ability of the Cardan joint to carry high torque loads. Moreover, under thrust loads, the normal manufacturing tolerance of a Hooke's joint or Cardan joint, by themselves, cause unacceptable vibrations.

To avoid the foregoing deleterious stress and load carrying consequences of Cardan-type universal joints, their use in vehicles is generally limited to applications where the normal angular articulation between the driving and driven members is substantially less than ten degrees, usually less than three degrees. Even then, as herein above set forth, other structure is provided to divert the axial thrust loads away from the Cardan-type universal joints. For example, British Pat. No. 765,659 discloses the use of a Cardan-type universal joint to carry just the driving torque. A spherical socket and a mating ball-shaped member are provided about the Cardan joint to divert the axial thrust loads away therefrom. The patent to Etnyre, U.S. Pat. No. 3,112,809, discloses the use of Cardan-type universal joints to couple the inboard and outboard ends of a live axle. Lateral forces on the wheel are disclosed as being resisted by the live axle and also by a cantilever leaf spring. The Cardan universal joints are disclosed as being capable of absorbing axial loads well in excess of those encountered under normal conditions, but such conditions are limited to use of the joints only as a drive member and not as a suspension member.

Being limited in their allowable articulation and not being able to carry axial thrust loads normally associated with an operating vehicle, Cardan-type universal joints are not used as a suspension member, thereby requiring other pivot points displaced outboard from such Cardan joint and additional suspension control members connected to such other pivot points to carry the axial thrust loads.

Constant velocity universal joints have heretofore been used with independent wheel suspension systems to avoid the debilitating effects of the foregoing cyclic speed variations of Cardan-type joints while permitting substantially greater articulation angles of the wheel with respect to the drive shaft or the drive shaft with respect to the differential of the power delivery unit. Constant velocity universal joints of the type that provide uniform velocity between the driving and driven members at any intersecting angle of the joint are shown in U.S. Pat. Nos. 2,046,584 to Rzeppa, U.S. Pat. No. 3,162,026 to Ritsema, and also commonly assigned U.S. Pat. Nos. 3,688,521, 3,928,985, 4,240,680 and 4,231,233, the specifications of which are hereby incorporated by reference. However, such known constant velocity universal joints have heretofore been used to carry just the driving torque transmitted through the spherical ball members of the joint. These balls ride in sets of opposing axial grooves formed on a partially-spherical inner joint member and on a partially-spherical outer joint member. Ball guide means, in the form of a cage, are positioned to capture and guide the balls through a homokinetic plane of rotation wherein the centers of the balls very nearly bisect the articulation angle between the spherical surfaces of the outer and inner joint members resulting in a constant velocity transmission of rotary motion. The ball cage normally consists of upper and lower partially-spherical surfaces guided, respectively, on the partially-spherical inner and outer surfaces of the joint members but are designed to have radial clearances therebetween in order to insure lubrication of the surfaces and thereby avoid excessive heat build up.

As explained more fully in U.S. Pat. No. 3,928,985, issued Dec. 30, 1975, when the connecting drive shafts transmit torque loads at an articulated angle, internally generated joint friction and joint geometry of such constant velocity universal joints cause the inner and outer joint members to shift with respect to each other to take up the aforementioned clearances. Balls in diametrically opposite sets of grooves are thrust in opposite directions, causing the cage to be somewhat tilted or skewed relative to the design. The forward and aft end portions of the upper and lower partially-spherical surfaces of the cage are tilted or skewed under torque transmitting loads and bear radially against the inner and outer spherical joint members. Such skewed contact between the inner and outer spherical surfaces of the cage with the respective inner and outer joint members is tolerated to avoid the undesirable friction effects of greater surface contacts with smaller clearances. The internally generated loads, as a result of torque transmission through the joint, have been observed to decrease from about a maximum of three hundred pounds per wheel, which occurs when maximum torque is transmitted at extreme articulation angles of the drive joints just before a vehicle begins to move.

In any event, the balls and axial grooves of the constant velocity universal joint have heretofore been used to translate the driving torque while the spherical portions of the inner and outer joint members experience the internally generated loads, such internally generated loads being carried either by direct contact between the inner and outer joint members or through the interposed spherical surfaces of the cage. As taught in U.S. Pat. No. 3,789,626, to Girguis, where one constant velocity universal joint was used as a fixed joint, as in the drive shaft of a rear drive motor vehicle, an object of such an application is to maintain the joint elements free of axial internal forces, even though the joint was constructed to absorb forces, at least those related to torque translation. In fact, the joint was designed to avoid transmitting axial forces through the control element. Therefore, when used at opposite ends of a driving half-shaft, one of such constant velocity universal joints has heretofore been of the axial slip or plunging variety, allowing movement axial of the driven joint with respect to the driving joint, and the constant velocity universal joint at the other end has been of the non-axial slip or fixed type not permitting such axial movement.

In any event, such constant velocity joints and the drive shaft that couple them have heretofore not been used to transmit anything more than torque loads, and the related internally generated axial loads. For example, U.S. Pat. No. 3,709,314, to Hickey, discloses the use of a Rzeppa or Bendix-Weiss type of constant velocity joint at both ends of each of two front-wheel drive shafts, and a Rzeppa type constant velocity joint is disclosed at both ends of each of two rear-wheel drive shafts. Hickey further discloses four suspension units of the type conventionally used to divert externally generated axial thrust loads away from the constant velocity universal joints. The suspension units are substantially similar, except for variations in torsion bar, shock absorber and linkage attachment points due to the location of the units, front to rear and side to side. Each typical suspension unit is disclosed as consisting of a conventional upper A-frame arm and lower A-frame arm. These are connected to tubular frame members by means of multiple brackets permitting vertical swinging motion. The wishbone ends of the A-frame arms are shown pivotably connected forward and aft of the center of each wheel, and in no instance is any drive shaft shown or disclosed as being any part of the suspension system or being a part of a typical suspension unit.

SUMMARY OF THE INVENTION

The present invention contemplates the use of constant velocity universal joint members as suspension members. With the present invention, one constant velocity universal joint is used as a suspension pivot point and, together with the half-shaft and the other joint, functions as a suspension control member, pivotable thereabout, as well as a torque transmitting member. The present invention uses constant velocity universal driving joints and their connecting shaft as a suspension control member regardless of whether axial movement of the driving member with respect to the driven member is permitted or prohibited. With the present invention, externally-generated lateral or axial thrust loads of the suspension system are carried directly through the constant velocity universal joints.

The present invention recognizes and utilizes the fact that the structures of the foregoing conventional constant velocity universal joints are of sufficient strength and durability to withstand the externally and internally-generated axial thrust loads encountered in normal vehicle suspension operation. The present invention further recognizes that constant velocity universal joints can be used as a suspension member of an independent wheel suspension system so as to make other suspension members unnecessary and to allow new suspension arrangements affording improved suspension performance at significant weight, space and cost savings.

The present invention contemplates the use of constant velocity universal joints at either the inboard and/or the outboard ends of a wheel drive shaft so as to function as an essential and indispensable part of an independent wheel suspension system. The conventional balls of each constant velocity universal joint transmit the driving torque, and the conventional inner and outer partially-spherical members of each constant velocity universal joint are used to translate any externally or internally-generated thrust loads in addition to positioning the balls in the homokinetic plane, either directly or indirectly through an interposed cage, to maintain a constant velocity drive at desired angles of articulation. The constant velocity universal joints and interconnecting drive shaft thereby act as one suspension member of an independent wheel suspension system having at least two members, both of which cooperate to articulate the wheel about at least two pivot points, one of which is an inboard constant velocity universal joint.

The present invention further recognizes that because the constant velocity universal joint uses balls to translate the driving torque and a spherical structure to carry the thrust load, the normal manufacturing tolerances associated with the ball structure do not produce vibrations which increase with axial thrust loads. Accordingly, the vibrations initiated by the balls in their tracks are not further translated.

It is a primary object of the present invention to provide a new and improved independent wheel suspension system.

It is a primary object of the present invention to utilize a constant velocity universal joint as a suspension member of an independent wheel suspension system to carry both driving torque and suspension loads.

It is another primary object of the present invention to provide an independent wheel suspension system using the elements of a conventional constant velocity universal joint to carry all axially generated thrust loads rather than diverting the externally-generated loads from the joints through either suspension members or structural load members coupled with the joints.

It is another primary object of the present invention to provide an independent wheel suspension system utilizing fixed constant velocity universal joints as suspension members, either at the inboard or the outboard ends of a drive shaft coupling a power delivery unit to a vehicle wheel.

It is another primary object of the present invention to provide an independent wheel suspension system wherein the constant velocity universal joints, as suspension members, carry axial thrust loads while also conventionally carrying driving torque.

It is another primary object of the present invention to provide an independent wheel suspension system wherein manufacturing tolerances associated with a constant velocity universal drive joint do not increase vibrations under increasing thrust loads.

It is a further object of the present invention to utilize the balls of constant velocity universal joints to transmit driving torque while using the partially-spherical surfaces of the joint members to position the balls in a homokinetic plane, either directly or through an interposed cage, while also acting as a suspension member and transmitting axial thrust loads either directly between the inner and outer partially-spherical members or through the interposed cage.

It is a further object of the present invention to gainfully use the skewing of the ball cages of a constant velocity universal joint to transmit all axial thrust loads.

It is a further object of the present invention to provide one member of an at least two member vehicle suspension system wherein the first member is a wheel drive shaft having a constant velocity universal joint at the inboard and outboard ends thereof and wherein both of the at least two suspension members pivot the wheel at the inboard constant velocity joint about a common swing axis through the two suspension members.

These and other objects of this invention will become apparent to those skilled in the art from the following detailed description taken in conjunction with the accompanying drawings and claims.

BRIEF DESCRIPTION OF THE DRAWINGS

FIG. 3 is an elevational view, partly in cross-section, and at an enlarged scale, of one type of conventional constant velocity universal joint that is suitable for use with an independent wheel suspension system of the present invention, and having a cage between the inner and outer joint members;

FIG. 4 is a fragmentary view at an enlarged scale of the cage and clearances thereabout of the constant velocity joint of FIG. 3;

DETAILED DESCRIPTION OF THE PREFERRED EMBODIMENT

Figure 1:
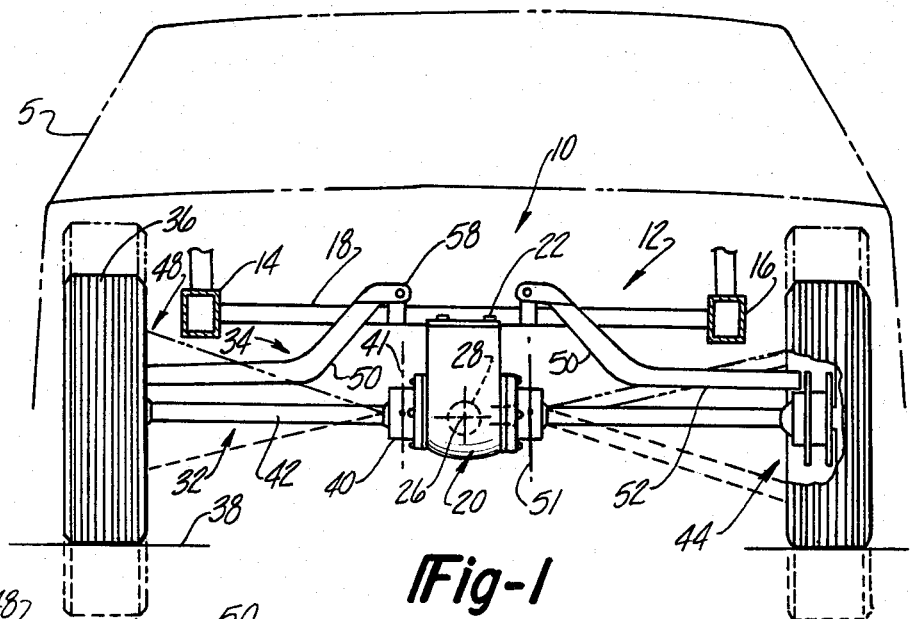
FIG. 1 is a schematic elevational view of a vehicle having an independent wheel suspension system including at least two suspension members the first member of which, in accordance with the present invention, includes a constant velocity universal joint at the inboard and outboard ends of the drive shaft connecting the power delivery unit to the driving wheels.
Figure 2:
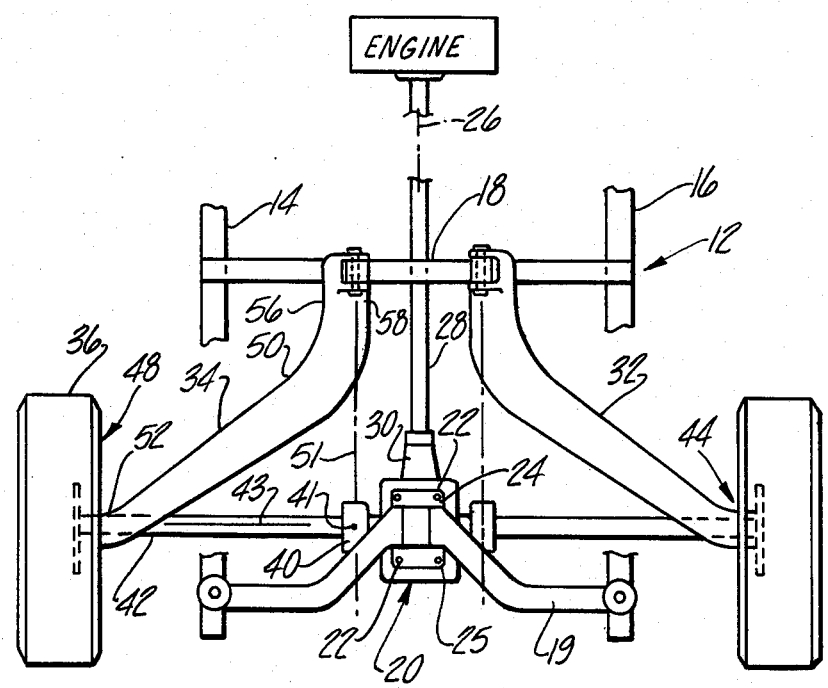
FIG. 2 is a schematic plan view of the independent wheel suspension system of FIG. 1.

Referring now to the drawings, there is shown in FIGS. 1 and 2 a rear view of a four-wheeled motor vehicle having a body 5 conventionally mounted to a chassis 10. Chassis as used herein is intended to include a vehicle made of unitary construction wherein some of the chassis components are provided in the body of the vehicle. The chassis 10 is supported in a known manner in the form of a frame 12, which includes first and second longitudinal frame members 14 and 16, appropriate resilient shock absorbing components, such as shock absorbers (not shown), and at least one transverse support member 18 spaced between the first and second longitudinal frame members. The vehicle also has a power delivery unit in the form of a conventional differential housing 20 mounted to a second transverse support member 19 by appropriate mounting studs 22 through a pair of mounting flanges 24 and 25. The differential housing 20 receives an input driving torque from an engine about a prop shaft axis 26 through a longitudinally extending prop shaft 28 and a conventional Cardan-type universal joint 30.

Each lateral side of the vehicle further has an independent wheel suspension system consisting of at least two suspension component members 32 and 34, for independently suspending each rear driving wheel 36 with respect to a driving surface 38.

Each first suspension component member 32 includes two couplings in the form of constant velocity universal joints coupled by a drive shaft. An inboard mounted constant velocity universal joint 40 is coupled by a drive shaft 42 to an outboard mounted constant velocity universal joint 44. The inboard constant velocity universal joint 40 is mounted to a lateral side of the differential housing 20 by suitable mounting studs 46, and the outboard constant velocity universal joint 44 is mounted to a wheel assembly 48 for driving the rear driving wheel 36.

The inboard and outboard constant velocity universal joints 40 and 44 are preferably of the fixed or non-axial movement type shown in greater detail in FIG. 3 or any of the aforementioned patents on constant velocity universal joints.

Figure 7:
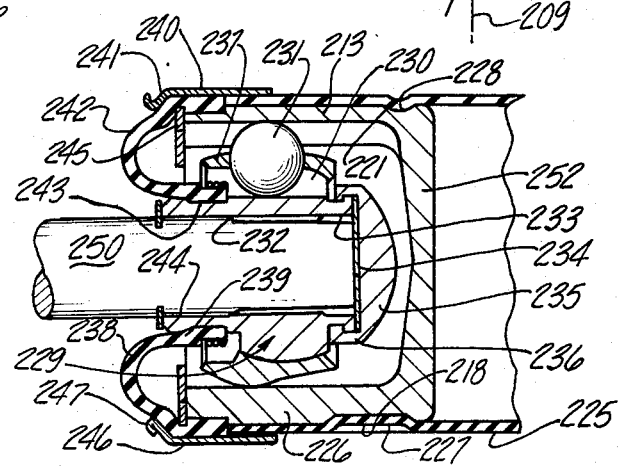
FIG. 7 is a view, partly in cross-section, of a third type of constant velocity universal joint suitable for use in certain applications of the present invention.

In certain applications, the constant velocity universal joints may also be of the axially plunging, telescoping, or splined types such as those shown in FIG. 7 and U.S. Pat. No. 3,688,521 to Smith, et al., issued Sept. 5, 1972, as long as such types, at either end of their axial travel, function as a part of the independent wheel suspension in accordance with this invention in the same manner as a fixed constant velocity universal joint. Moreover, some applications may require that only the inboard coupling be of the constant velocity type, the outboard joint being a coupling of another type, either universal or otherwise.

Each second suspension component member 34 of each independent wheel suspension system consists of a suspension control arm 50 having a wheel end 52 mounted to the wheel assembly 48 at a first control arm pivot 54 and a frame end 56 mounted to the transverse support member 18 at a second control arm pivot 58.

With reference to FIG. 2, each of the first and second suspension component members 32 and 34 are an indispensable part of the independent wheel suspension system and cooperate to allow articulation of the drive shaft axis 43 of the drive shaft 42 through an articulation angle A, as shown in FIG. 3, about respective joint articulation axes 41 and 45 of the inboard and outboard constant velocity universal joints 40 and 44, respectively. The articulation angle A is measured about the joint articulation axes 41 or 45 between the drive shaft axis 43 of the drive shaft 42 and the respective axes 21 or 49 coaxial with the differential housing and the wheel of the differential housing 20 of the wheel assembly 48.

The first and second suspension component members 32 and 34 further cooperate to cause the rear driving wheel 36 to swing about both the second control arm pivot 58 and about the joint articulation axis 41 of the inboard constant velocity universal joint 40 about a swing axis 51 therebetween. To minimize the change of camber of the rear driving wheels 36 during the suspension movement, the second control arm pivot 58 is located on the transverse support member 18 transversely the aforesaid intermediate the prop shaft axis 26 of the prop shaft 28 and the joint articulation axis 41 of the inboard constant velocity universal joint 40.

With reference to FIG. 3, each of the inboard and outboard constant velocity universal joints 40 and 44 consist of an inner joint member 70 and an outer joint member 72. The inner joint member 70 is engaged by a splined end 74 of a trunnion shaft 76 and retained by a snap ring 78 against a shoulder 79 thereon to prevent axial movement of the inner joint member along the wheel axis 49. The trunnion shaft 76 is suitably secured to a wheel hub 80 by a splined or other known connection 81 to a wheel or brake (not shown). The wheel hub 80 is attached in a conventional manner to an inner bearing ring member 82 having a pair of circumferential grooves 84 in its outer surface. The circumferential grooves 84 receive bearing balls 86 extending into similar grooves 88 in the inner surface of an outer bearing ring member 90. The wheel assembly 48 is fastened to the suspension control arm 50 through the outer bearing ring member 90. While in the preferred embodiment, the inner joint member 70 is shown secured to the wheel assembly and the outer joint member 72 is shown secured to the end of the drive shaft 42, it will be understood by those skilled in the art that the inner and outer joint members of each constant velocity universal joint could be interchanged so that, for example, the outboard constant velocity universal joint 44 could also be applied with the inner joint member mounted at the end of the drive shaft 42 and the outer joint member 72 secured to the wheel assembly 48.

Figure 5:
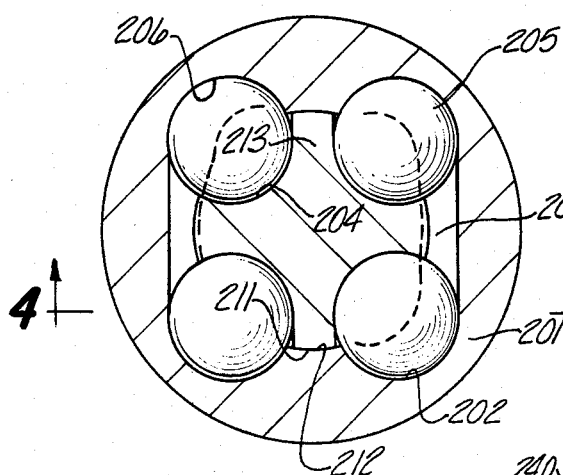
FIG. 5 is a view, partly in cross-section, of a second type of conventional constant velocity universal joint suitable for use with the present invention and not having a cage interposed between the inner and outer joint member.
Figure 6:
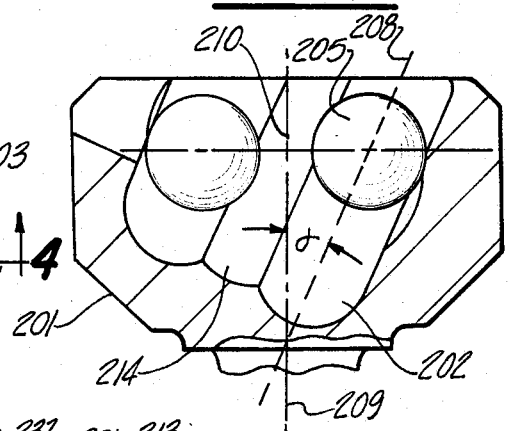
FIG. 6 is a view, partly in cross-section, along line 4—4 of FIG. 5.

The inner and outer joint members 70 and 72, as shown in FIG. 3 and FIG. 4, respectively, include an outer and an inner partially-spherical surface 100 and 102 having formed therein and uniformly spaced thereabout six sets of opposed grooves 104 and 106 extending in a predetermined manner along the respective inner and outer joint drive axes 21 and 49, such grooves preferably being radially spaced from and axially aligned with the axis of the half-shaft, as shown in FIG. 3, but which may also be skewed as in other known constant velocity universal joints, such as those shown in FIGS. 5 and 6 and U.S. Pat. No. 4,231,233, issued Nov. 4, 1980, the specification of which is hereby incorporated herein by reference.

To transmit driving torque from one of the inner and outer joint members 70 and 72 to the other, a ball 108 is positioned in each of the six sets of opposed grooves 104 and 106 each ball and is guidingly positioned therein to have their ball centers lie in what is known as the homokinetic plane bisecting the supplement of the articulation angle A between the drive shaft axis 43 and the wheel axis 49 of the trunnion shaft 76 so as to transfer the velocity of one such shaft at a constant velocity to the other of such shaft.

The balls 108 are so positioned in the homokinetic plane by ball control means in the form of an annularly-shaped cage 110 having six ball apertures 112 spaced uniformly thereabout and intermediate opposite cage end portions 114 and 116. The opposite end portions 114 and 116 have an upper and a lower partially-spherical cage surface 118 and 120. For the purpose of illustration, FIG. 4 shows an exaggerated clearance of about 0.002 inches which is normally provided between the upper and lower partially-spherical cage surfaces 118 and 120 and the respective juxtaposed inner and outer partially-spherical surface 102 and 100 of the respective out and inner joint members 72 and 70, thereby providing a total radial clearance of about 0.004 inches. This tolerance helps to reduce the internal resistance that would otherwise result from surface to surface contact between juxtaposed spherical sections as the joints articulate. Such clearance, therefore, exist only when there is no articulation and no torsional load translated through the joint (i.e., an articulation angle A of zero degrees). As the angle of articulation and the driving torque increases, such clearances result in surface contact with the respective adjoining members at the end portions of the cage as has been exaggerated (shown) in FIG. 4.

For reasons explained more fully in the patents incorporated herein by reference, for example that issued to Girguis, U.S. Pat. No. 3,928,985, the centers of curvature of the inner and outer partially-spherical surfaces 102 and 100 are located on the joint axis on opposite sides of the homokinetic plane therethrough. Not having the same radius, the partially-spherical surfaces of the inner and outer joint members impose internally generated axial thrust forces on the balls causing one half of the balls 108 to be thrust in one direction along the joint drive axis and the other half along the opposite direction, the magnitude of such internally generated thrust forces increasing with increasing angles of articulation and driving torque.

The foregoing opposite axial thrust forces causes the cage 110 to skew relative to its design position, one of the end portions 114 being skewed radially inward to contact the outer partially-spherical surface 100 of the inner joint member 70 while the other of the end portions 116 is skewed radially outward to contact the inner partially-spherical surface 102 of the outer joint member 72.

To withstand the magnitude of the foregoing internally-generated thrust forces on the balls with increasing joint articulation and driving torque, the cage end portions of the cage 110 used in a constant velocity universal joint are designed to have a sufficient radial thickness, typically in excess of 1/5 inch, and an axial length between each ball aperture and each end portion, typically ⅜ inch, so that the cage 110 can safely withstand an internally-generated axial thrust load of up to a few hundred pounds, such loading also being withstood by each of the six segments (not shown) extending axially between adjacent balls. Such design of the cage, as well as of the partially-spherical surfaces of the inner and outer joint members, is based on the worst load condition existing at a high articulation angle at startup or breakaway torque. Thereafter, the driving torque is typically less than a third of the breakaway torque and the articulation angles are nominally less than three or four degrees depending on quiescent design and road handling characteristics. Under the latter normal driving conditions, the internally-generated axial thrust loads carried by the foregoing elements of each joint are proportionately less, allowing the joints to carry externally-generated loads of proportionately greater magnitude. In one series of tests conducted on an automotive grade constant velocity universal joint, it was observed that the joint withstands at least one thousand pounds of externally-generated axial thrust load for the maximum automotive design life, with the joint undergoing constant maximum articulation and constantly carrying maximum driving torque. It was further observed that under momentary maximum breakaway torque, the conventional joint could withstand externally-generated thrust loads at least two or three times greater than one thousand pounds. In other words, the present invention recognizes that a conventional constant velocity universal joint of the type disclosed and incorporated by reference can regularly withstand externally-generated thrust loads of at least one thousand pounds and under momentary extreme articulation and load conditions up to three thousand pounds.

The present invention, thus, gainfully utilizes a heretofore required skewing of the cage to transmit these externally-generated axial loads, first from the outer joint member of the outboard constant velocity universal joint to the inner joint member, then through the drive shaft, and finally one of the inner and the outer joint members of the inboard constant velocity universal joint to the other. Such externally-generated loads can also be transmitted outwards from the differential depending on the source of the thrust load. For example, such externally-generated thrust loads could be directed in the inward transverse direction from the wheel to the differential in response to jounce and rebound of the wheel or could even be transmitted transversely outwards from the differential to the wheel in those design applications where the differential might be permitted such transverse movement.

Regardless of the inward or outward direction of the externally-generated axial thrust loads, they are borne, carried, or transmitted between the elements of a first member of the independent wheel suspension system consisting of the inboard and outboard constant velocity universal joints, the drive shaft coupled therebetween, and the wheel and the wheel assembly. This first member of the independent wheel suspension system, therefore, is an indispensable, but independent, part of the entire independent wheel suspension system requiring at least one other suspension member in the form of the suspension control arm 50 mounted to the frame.

A further feature of the present invention, resulting from having at least two suspension members for each independent wheel suspension, is that both suspension members must inevitably swing relative to the power delivery unit at the inboard constant velocity universal joint 40 about a swing axis 51, shown schematically in FIGS. 1 and 2, and defined as existing between the homokinetic center of the inboard constant velocity universal joint and the pivot axis of the control arm end 56 of the suspension control arm 50 providing the second suspension component member 34. Moreover, having the homokinetic center of one of the two joints defining the swing axis 51 already mounted close to the prop shaft axis 26 of the differential housing 20 allows the control arm end 56 of the suspension control arm 50 to be pivoted at the second control arm pivot 58, selected to minimize the camber of the rear driving wheel 36 in response to jounce and rebound thereof. In a preferred embodiment, the suspension control arm 50 is connected to the transverse support member 18 at a point thereon selected so that swing axis 51 is preferably parallel to the prop shaft axis 26.

The joint illustrated in FIGS. 5 and 6 and as explained in greater detail in U.S. Pat. No. 4,231,233, issued Nov. 4, 1980, hereby incorporated by reference, consists of an outer joint member 201 containing grooves 202 in the surface defining its inner spherical hollow space, an inner joint member 203 located within the hollow space in the outer joint member with grooves 204 formed in the outer surface of the inner joint member. Balls 205 are positioned between a pair of oppositely arranged grooves 202 and 204 and, due to the arrangement of the grooves, the balls are held in a plane bisecting the angle between the axis of rotation of the parts of the constant velocity universal joint. The centerline of the groove 204 in the inner joint member extends along a circular arc 206; however, it is possible that the centerline could be formed of a circular arc and additional straight line. The grooves 202 formed in the inner surface of the outer joint member extend in a mirror-inverted manner relative to the groove 204 in the outer surface of the inner joint member 203. Torque transmission between the outer joint member 201 and the inner joint member 203 is effected through the balls 205. The grooves 202 on the opposite sides of the outer joint member are formed along the same circular arc contained in a plane 208 disposed at an angle alpha relative to the axis of rotation 209 of the outer joint member and intersecting this axis at a distant space from the center 210 of the joint. The center 210 is located on the axis of rotation of both the joint members.

Due to the spherically-shaped outer surface 211 of the inner joint member 203, which is guided in the spherically-shaped inner surface 212 defining the hollow space 214 of the outer joint member 201, axial movement between the two members is impossible. Moreover, externally-generated thrust loads are transmitted directly from one of the inner and outer surfaces 212 and 211, respectively, of the outer and inner joint members 201 and 203 to the other. Because of the arrangement of the grooves 202 and 204 in the outer joint member 201 and the inner joint member 203, respectively, webs 213 are formed in the inner joint member between adjacent grooves to serve as guide surfaces in combination with the spherically-shaped inner surface 212 defining the hollow space 214 in the outer joint member 201.

The constant velocity universal joint shown in FIG. 7 illustrates one end portion of an inner or outer constant velocity universal joint or of a propeller shaft assembly for a motor vehicle transmission. The constant velocity universal joint has a tubular shaft 225 and a plunging constant velocity universal joint at each end thereof. The outer member 226 of the constant velocity universal joint is constructed as shown and, as can be seen, portions 227 and 228 of the tubular shaft 225 are deformed inwardly so as to enter the axial groove 218 and the circumferential groove 221 in the outer member 226.

The inner member 229 of the constant velocity universal joint has a partially-spherical outer surface which is machined to provide equiangularly spaced grooves 230 which are parallel to the rotational axis of the inner member. The grooves 230 of the inner member 229 cooperate in pairs with the track formations or webs 213 of the outer member 226 to provide ball tracks along which balls 231 move during relative angular and axial movements between the constant velocity universal joint members.

The inner member 229 is provided with a bore 232 which, over a portion of its length, is internally splined so that it can have a splined connection with a driving or driven shaft 250 having a correspondingly splined portion. This correspondingly splined portion of the shaft is formed with an annular groove in which a spring clip is located and the spring clip is compressed as it passes through the splined portion of the bore 232 and then, when it reaches the inner end portion 233 of the bore 232, the spring clip expands resiliently so as to hold the shaft in engagement with the inner member 229.

The bore 232 in the inner member 229 is closed by an end plate 234, and a resilient pad 235 is fitted over the end plate 234 and includes a generally cylindrical portion 236 having an inwardly turned lip which seats in an annular groove formed in the inner end part of the inner member 229.

A ball cage 237, with apertures in which the balls 231 are closely received, is positioned between the inner and outer members 229 and 226 of the constant velocity universal joint and acts to center the inner member 229 within the outer member 226. The configuration of the cage 237 and the configurations of the cooperating surfaces of the inner and outer members with which it engages are as described in U.S. Pat. No. 3,464,232 to which reference should be had.

A sealing member 238 of generally annular form is secured to the inner and outer members of the constant velocity universal joint and the sealing member 238 includes an inner generally cylindrical portion 239 having a radial end lip, an outer generally cylindrical portion 240 adjacent which there is an increased wall thickness portion 241, and an arcuate portion 242 interconnecting the inner and outer generally cylindrical portions 239 and 240.

The inner member 229 of the constant velocity universal joint includes a portion 243 onto which the generally cylindrical inner portion 239 of the sealing member 238 is secured by means of a fastener and, adjacent the portion 243, the inner member 229 includes a portion 244 which is of increased cross-section compared with the portion 243 and which is of arcuate form in longitudinal section. The sealing member 238 is originally formed so that the cylindrical inner portion 239 and the part of the sealing member adjacent thereto are substantially in alignment and the increased diameter portion 244 of the inner member 229 serves to bias the engaged part of the sealing member 238 outwardly relative to the axis of the inner member 229. In this way, when the constant velocity universal joint is in use and axial movement takes place between the inner and outer members of the constant velocity universal joint, the sealing member 238 will not tend to move inwardly into engagement with the shaft on which the inner member 229 is carried. When the shaft and the constant velocity universal joint are rotating at high speed, the part of the sealing member 238 nearest to the shaft will be urged centrifugally outwardly relative to the axis of the inner member 229 to prevent the sealing member 238 from engaging the shaft at high speed.

The increased wall thickness portion 241 of the sealing member 238 serves to locate a washer 245 in engagement with the end face of the outer member 226 and the outer generally cylindrical portion 240 of the sealing member 238 is secured to the outer member 226 by means of a retaining sleeve 246 which is formed as, for example, a metal pressing and includes a lip portion 247 which, on assembly of the constant velocity universal joint, is pressed inwardly towards the adjacent face of the outer member 226 so as to urge the washer 245 into engagement with the radial end face of the outer member 226.

The washer 245 is arranged so that it projects beyond the bases of the ball-receiving track formations 213 of the outer member 226, and as the washer 245 is urged resiliently by the sealing member 238 into engagement with the end face of the outer member 226, the washer 245 serves as a resilient end stop limiting the extent of axial movement of the balls 231 within the track formations 213 and, thus, limiting the amount of plunge of the inner member 229 relative to the outer member 226 in a direction outwardly of the tubular shaft 225. The arrangement is such that when the inner member 229 moves outwardly relative to the outer member 226 so that the cage 237 contacts the washer 245, any further force tending to move the inner member outwardly relative to the outer member will be transmitted by engagement of the cage 237 with the washer 245 to the plunging joint at the outer end of the shaft 225 resulting in movement of the outer member of the constant velocity universal joint at the other end of the tubular shaft 225 away from its associated inner member.

At the other end of each track formation 213, the extent of movement of the balls 231 is limited by engagement of the resilient end pad or stop 235 with the adjacent part of the end wall 252 of the outer member 226.

While the foregoing description has been set forth to disclose only one embodiment of the present invention and presently known alternatives thereto, it will be understood that the invention may be used and modified in other ways without departing from the spirit of the invention or its principle and is limited only by the appended claims.

What is claimed is:

1. An independent wheel suspension system for a vehicle having a chassis supported by chassis support means and power delivery means mounted to said chassis support means, said power delivery means adapted to provide a driving torque to wheel means positioned laterally of said power delivery means and to rotate said wheel means on a driving surface in response to said driving torque, said independent wheel suspension system comprising at least a first and a second suspension member, said first suspension member comprising:

a first and a second coupling, one coupling of said first and second coupling comprising an inboard constant velocity joint, having an inner joint member, an outer joint member, and a cage member located therebetween, said inner joint member, outer joint member, and cage member having partially-spherical surfaces thereon adapted to allow a joint articulation therebetween about a first predetermined axis, said partially-spherical surfaces of said inner joint, outer joint, and cage members adapted to transmit an axial thrust load therebetween, said inner and outer joint members further having sets of opposed grooves formed therein along a joint axis and distributed angularly thereabout, each said set of opposed grooves engaged by torque-transmitting balls rotatably constrained by said cage member and adapted to move axially along said grooves during said articulation to transmit said driving torque therebetween, one of said inner and outer joint members of said inboard constant velocity joint being respectively connected to one of said power delivery means and said wheel means, said first predetermined axis and said joint axis having an intersection, said intersection establishing a joint center;

drive shaft means connected to the other of said inner and outer joint members of the other coupling of said first and second coupling, whereby said drive shaft means communicates between said first and said second coupling, both said driving torque transmitted by said torque-transmitting balls and also said axial thrust load transmitted between said partially-spherical surfaces of said inner joint, outer joint, and cage members;

said second suspension member comprising a suspension control arm having a wheel end connected to said wheel means and a frame end connected to said chassis support means; and a swing axis through said frame end and said joint center;

whereby said first and said second suspension members allow said wheel means to swing at said inboard constant velocity joint about said swing axis therethrough.

2. The independent wheel suspension system of claim 1, wherein said axial thrust load comprises an internally-generated portion generated within said inboard constant velocity joint and an externally-generated portion generated externally thereto, said internally-generated portion being generated in response to at least one of said joint articulations and said driving torque and said externally-generated portion being generated in response to said articulation of said wheel means relative to said driving surface.

3. The independent wheel suspension system of claim 1, wherein said inboard constant velocity joint is fixed to said drive shaft means such that said cage means operative during said joint articulation to both guidingly constrain said balls in a homokinetic plane through said joint axis while also transmitting said axial thrust load between said inner and outer joint members.

4. The independent wheel suspension system of claim 2, wherein said partially-spherical cage surfaces comprise a first and a second end portion respectively extending a first and a second opposite axial direction from said ball apertures, said first and second end portions having a predetermined strength to axially restrain said balls during extreme articulation under high torque loads while also transmitting axial thrust loads, said axial thrust loads being transmitted from one of said partially-spherical surfaces of said inner and outer joint members to one of said partially-spherical cage surfaces of one of said first and second end portions to the other of said partially-spherical cage surfaces of said other of said first and second end portions.

5. The independent wheel suspension system of claim 1 wherein said axial thrust load exceeds three hundred pounds.

6. The independent wheel suspension system of claim 1, wherein said power delivery means comprises one of a differential gearing means and a transaxle means, and wherein said other coupling of said first and second couplings comprises an outboard constant velocity joint.

7. The independent wheel suspension system of claim 6, wherein one of said inboard and outboard constant velocity joints comprises a fixed joint.

8. An independent wheel suspension system comprising:
- a driving wheel;
- a power delivery unit;
- a chassis support means supporting said power delivery unit;
- an inboard constant velocity universal joint having an inboard inner joint member, an inboard outer joint member, and first cage means located between said inboard inner and outer joint members, said inboard outer joint member being fixedly mounted to said power delivery unit so as to prohibit axial movement therebetween;
- an outboard constant velocity universal joint having an outboard inner joint member, an outboard outer joint member, and second cage means located between said outboard inner and outer joint members, said outboard outer joint member being fixedly mounted to said driving wheel so as to prohibit axial movement therebetween;
- a drive shaft coupling said inboard and outboard constant velocity universal joints so as to prohibit axial movement therebetween; and
- means for transmitting an axial thrust load between said driving wheel and said power delivery unit, said axial thrust load transmitting means being complementary with said inboard and outboard constant velocity universal joints whereby said inboard and outboard constant velocity universal joints and said drive shaft are axially fixed with respect to said driving wheel and said power delivery unit to establish a first suspension member as an axial load bearing component of said independent wheel suspension system.

9. The independent wheel suspension system of claim 8, wherein said axial thrust load exceeds three hundred pounds and comprises an internally-generated portion and an externally-generated portion.

10. An independent wheel suspension system comprising:
- a driving wheel;
- a power delivery unit;
- a chassis support means supporting said power delivery means;
- an inboard constant velocity universal joint having an inboard inner joint member, an inboard outer joint member, and first cage means located between said inboard inner and outer joint members, said inboard outer joint member being fixedly mounted to said power delivery unit so as to prohibit axial movement therebetween;
- an outboard constant velocity universal joint having an outboard inner joint member, an outboard outer joint member, and second cage means located between said outboard inner and outer joint members, said outboard outer joint member being fixedly mounted to said driving wheel so as to prohibit axial movement therebetween;
- a drive shaft coupling said inboard and outboard constant velocity universal joints;
- one of said constant velocity universal joints further having means prohibiting axial movement between said outer joint member and said drive shaft;
- the other of said constant velocity universal joints further having a first predetermined axial movement between said outer joint member and said drive shaft as said driving wheel articulates with respect to said power delivery unit and means limiting said first predetermined axial movement of said outer joint member with respect to said drive shaft whereby said limiting means prohibits further axial movement between said drive shaft and said outer joint member; and
- means for transmitting an axial thrust load between said driving wheel and said power delivery unit, said axial thrust load transmitting means being complementary with one of said one and said other of said constant velocity universal joints whereby said inboard and outboard constant velocity universal joints and said drive shaft cooperate to provide an axial load bearing component member of said independent wheel suspension system.

11. The independent wheel suspension system as claimed in claim 8 wherein said means for transmitting an axial thrust load between said driving wheel and said power delivery unit further comprises:
- a second suspension control arm member having a wheel end connected to said driving wheel and a chassis end connected to said chassis support means; and
- a swing axis through said chassis end and said inboard constant velocity universal joint whereby said second suspension member and said first suspension member allow said driving wheel to swing about said swing axis.

12. The independent wheel suspension system as claimed in claim 10 wherein said means for transmitting an axial thrust load between said driving wheel and said power delivery unit further comprises:
- a second suspension control arm member having a wheel end connected to said driving wheel and a chassis end connected to said chassis support means; and
- a swing axis through said chassis end and said inboard constant velocity universal joint whereby said second suspension member and said axial load bearing component member allow said driving wheel to swing about said swing axis.

* * * * *